United States Patent [19]

Larsson

[11] Patent Number: 4,946,336
[45] Date of Patent: Aug. 7, 1990

[54] DEVICE FOR CONTACT-FREE PIVOTING OF A STRUCTURE MEMBER

[75] Inventor: Ove Larsson, Gothenburg, Sweden

[73] Assignee: Spine Engineering AB, Molndal, Sweden

[21] Appl. No.: 265,343

[22] Filed: Oct. 28, 1988

Related U.S. Application Data

[63] Continuation-in-part of Ser. No. 872,877, Jun. 11, 1986, abandoned.

[30] Foreign Application Priority Data

Jun. 12, 1985 [SE] Sweden ................................ 8502899

[51] Int. Cl.⁵ .................................................. B66C 1/04
[52] U.S. Cl. .................................... 414/744.2; 49/262; 414/684.3; 414/737
[58] Field of Search .................... 118/500; 212/166; 901/7

[56] References Cited

U.S. PATENT DOCUMENTS

| | | | |
|---|---|---|---|
| 3,129,471 | 4/1964 | Johnson et al. | 49/64 |
| 3,153,819 | 10/1964 | Bond | 49/64 |
| 3,346,993 | 10/1967 | Johnson | 49/409 |
| 3,503,527 | 3/1970 | Devol | 901/40 X |
| 4,197,772 | 4/1980 | Anderson et al. | 414/744 C X |
| 4,332,989 | 6/1982 | Nicolaisen | 901/49 X |
| 4,342,535 | 8/1982 | Bartlett et al. | 414/744 A |
| 4,342,536 | 8/1982 | Akeel et al. | |
| 4,350,379 | 9/1982 | Peroutky | 901/40 X |
| 4,423,999 | 1/1984 | Choly | 414/744 A |
| 4,498,414 | 2/1985 | Kiba et al. | 901/43 X |
| 4,546,724 | 10/1985 | Kiryu et al. | 414/735 X |
| 4,552,506 | 11/1985 | Cummins et al. | 414/735 |
| 4,556,361 | 12/1985 | Bartlett et al. | |
| 4,636,136 | 1/1987 | Nomura et al. | 414/684.3 X |
| 4,674,231 | 6/1987 | Radek et al. | 49/118 |
| 4,702,666 | 10/1987 | Iwao et al. | 901/43 X |
| 4,743,159 | 5/1988 | Inamori | 901/7 X |

FOREIGN PATENT DOCUMENTS

| | | | |
|---|---|---|---|
| 1131553 | 6/1962 | Fed. Rep. of Germany | 49/118 |
| 2945848 | 5/1981 | Fed. Rep. of Germany . | |
| 52-46584 | 4/1977 | Japan | 414/744 C |
| 534797 | 4/1973 | Switzerland . | |
| 0602366 | 3/1978 | U.S.S.R. | 901/9 |
| 2106077 | 4/1983 | United Kingdom | 901/49 |

Primary Examiner—Robert J. Spar
Assistant Examiner—William M. Hienz
Attorney, Agent, or Firm—Cushman, Darby & Cushman

[57] ABSTRACT

A device for pivoting a structural member about the axle of a hinge, and hinge being fitted to the structural member and to an object so as to permit pivoting of the member relative to the object, the member having at least one edge portion which is magnetic and which swings along a planar path when the member pivots about the hinge axle relative to the object, the device including: an arm pivoted for rotation about an axis which is parallel to the hinge axle; at least one magnet carried by the arm, the arrangement being such that, upon pivoting of the arm, the magnet moves in a path parallel to the path of the magnetic edge portion of the member and spaced a small distance from the path of the magnetic edge portion to provide an air gap between the magnet edge portion and the magnet, whereby the magnet and the magnetic edge portion are out of contact with each other but can be magnetically coupled so as to move simultaneously in their respective paths upon pivoting of the member relative to the body; and a mechanical for swinging said arm about its pivot axis.

11 Claims, 5 Drawing Sheets

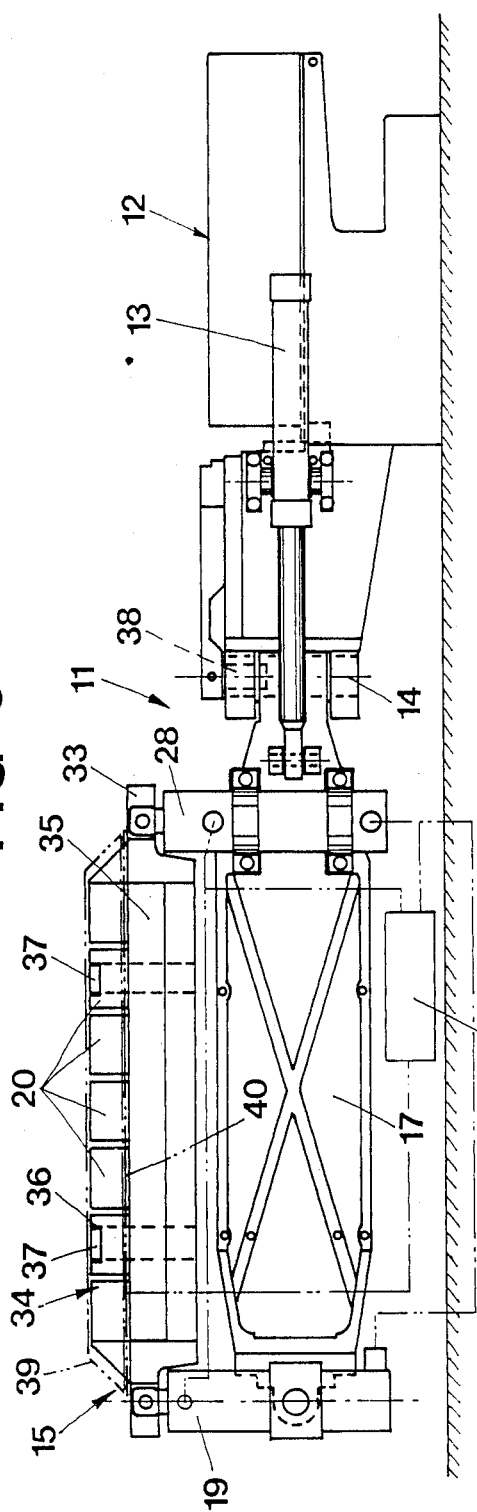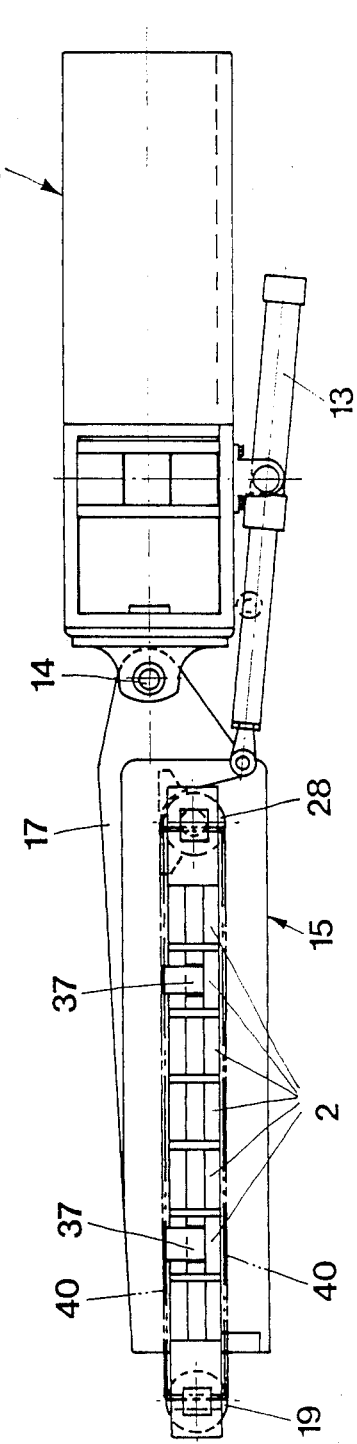

DEVICE FOR CONTACT-FREE PIVOTING OF A STRUCTURE MEMBER

This is a continuation-in-part of application Ser. No. 872,877 filed June 11, 1986 now abandoned.

The present invention relates to a device for contact-free pivoting of a pivotable structure member about an axle of a hinge, e.g., a door, a lid or the like, of an object movable along a path, with the aid of at least one magnet.

BACKGROUND OF THE INVENTION

During series production of passenger cars, and particularly during surface treatment with the aid of robots, it is a requirement to be able to paint the car body externally as well as internally without contaminating the freshly painted surface. This means that it must be possible automatically to open and close the doors of the car body, without there being deposited any marks on the freshly painted doors. This problem has hitherto been solved with a robot, which e.g. is programmed to find a specific place on the door, e.g. a bore in which the lock components are intended to be affixed, and where the robot with aid of a tool pulls the door towards itself and after painting also closes the door. A prerequisite for this opening and closing operation is that the car body is positioned rather accurately relative to the robot, which in turn means that the robot has to be so complex as to be able to make the rather complicated motion patterns required for the opening and closing. Robots of this type are very expensive and they furthermore take up a great deal of space.

The same or similar problems will arise during other operations in the car industry and also in other industries.

It is known from CH 534797 to open a door of a building with the aid of electromagnets, which are recessed in a door leaf and the magnet poles of which face the floor, where they cooperate with ferromagnetic blocks recessed in the floor. By activating the magnets successively with programming equipment a displacement is obtained between the blocks.

SUMMARY OF THE INVENTION

The object of the present invention is to provide a manipulator which in a contact-free manner can open and close a car door, a motor hood, a trunk flap or other structural member. The same manipulator, if so desired, is able first to open one door, e.g. the front door and thereupon, after a displacement either of the car body or of the manipulator, to open the rear door. The manipulator requires only little space and it can be located completely or partly below the car body, if the latter is transported on a conveyor system. Rather large tolerances are allowable during the positioning of the car body relative to the manipulator. These tasks are carried out by locating magnets along, but at some distance outside the pivoting area of the structural member, the magnets being arranged via an air gap to exert a magnetic force on at least one of the limiting sides of the member, e.g. its lower and/or upper edge. The magnets are movable along a predetermined path or they may be fixedly arranged in a pattern. Upon relative motion between the car body and the magnets, the member is subjected to a pivoting movement about its hinge axis.

BRIEF DESCRIPTION OF THE DRAWINGS

The invention will hereinafter be further described with reference to the drawings, which show several embodiments.

FIGS. 5 and 6 show a further embodiment of a manipulator;

DETAILED DESCRIPTION

Figure 1:
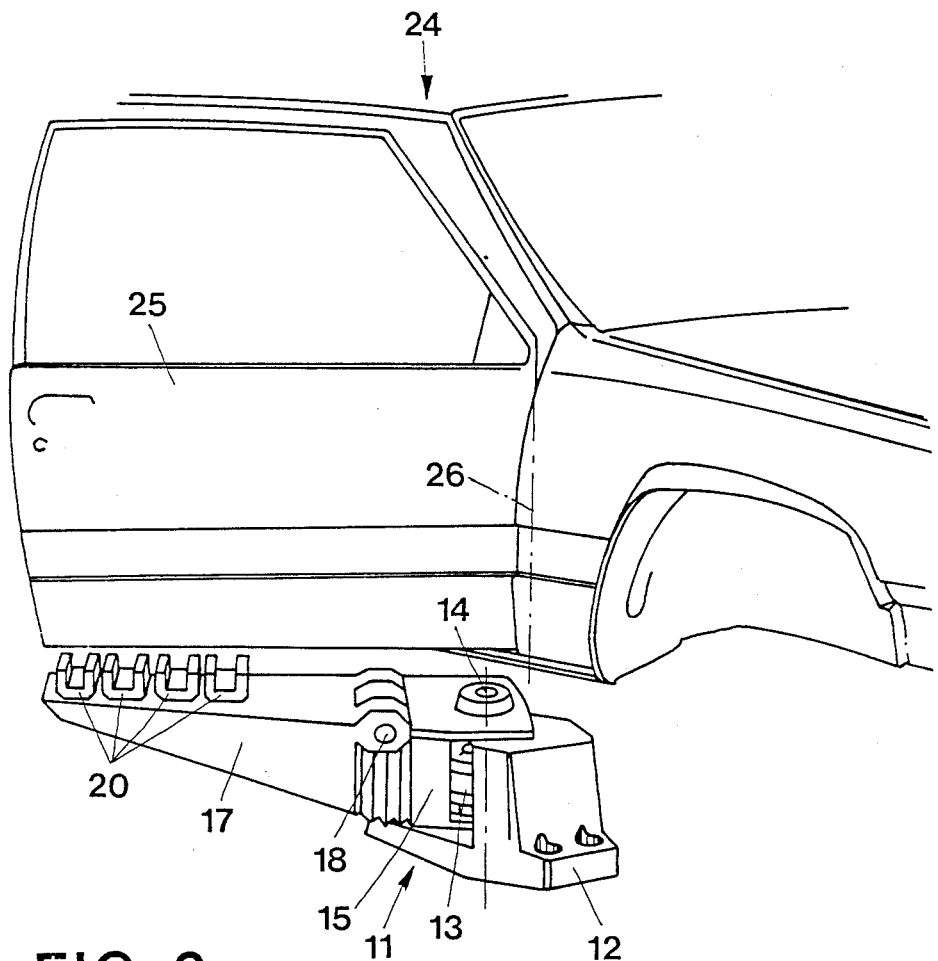
FIG. 1 shows in perspective a portion of a passenger car body and a manipulator according to the invention during the opening or closing motion of a car door.
Figure 2:
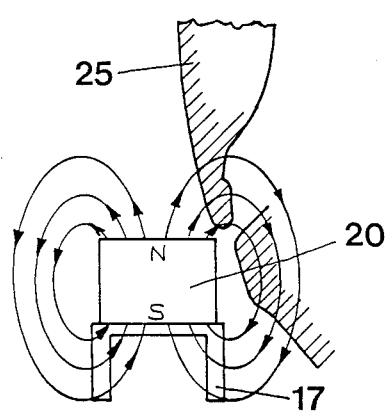
FIG. 2 shows a section through the lower portion of a car door with the magnet arm of the manipulator in position for opening the door.

The manipulator 11 according to the invention includes a frame 12, which supports an actuator 13, e.g. in the form of a pivoting hydraulic jack (shown in FIGS. 1, 3 and 4) or in the form of reciprocating piston-cylinder device (FIGS. 5 and 6), and which is arranged to pivot a bracket 15. The actuator 13 is articulated to the frame, around a pivot axle 14. In the embodiment shown in FIGS. 1 and 3, the bracket 15 includes a carrier 16 and an arm 17 pivotably supported about a horizontal axle 18. The horizontal or inclination angle of the arm is adjustable by means of a servo mechanism 19 which is articulated to the carrier 16 and also to the arm 17. On the upper side of the arm 17 there are fitted a number of magnets 20 in such a manner that their poles are facing upwards towards a structural member such as a door 25. The manipulator is arranged outside the pivot area of the member 25, thus only a small air gap separates the member from the manipulator, when activated.

In cases where the manipulator has to be adaptable to height variations of the object to be acted upon, the frame 12 of the manipulator is provided with a vertically and laterally adjustable plate 21, which in turn via a horizontal hinge 22 supports a carrier 23, to which the actuator 13 is affixed. The actuator thus can be adjusted vertically, laterally and with respect to its inclination against the horizontal plane.

The manipulator is intended particularly for contact-free openings and closing of the doors 25 of a passenger car body 24, which is transported upon a conveyor (not shown) and which forms an important part e.g. of an automatized surface treatment system, where painting is carried out by robots. The manipulator of course can also be adapted to other working functions. Depending upon how the working process shall be accomplished there may be a manipulator on each side of the car body. The manipulators can be programmed in such a manner that they first open and then close one front door each and repeat the same procedure on the rear door after a displacement of the car body. It is however also possible to arrange a manipulator for each door, and if the painting is made according to the line production principle it is possible to design the manipulators such that they will perform a travelling motion synchronized with the motion of the car body. Another alternative is that a manipulator is intended only for opening the doors and another manipulator closes the door.

The manipulator 11 is designed with such a low height, that it can be accommodated mainly below the car body being transported on a conveyor track. The position of the manipulator relative to the car body is therefore chosen so that the manipulator arm 17 will be situated just in front of and below the door 25 to be opened. It is thereby not absolutely necessary that the hinge axle 26 of the door 25 is aligned with the vertical pivot axle 14 of the manipulator, but certain differences can be accepted. Due to the demand for contact-freeness and a reliable function it is however essential that these two axles are mainly parallel.

In the manufacturing phase in which the car body is illustrated, the locking means of the car is not yet installed and the door is held in closed position by means of springs in the door or by a temporary magnetic fixture. When opening the door it is therefore necessary to overcome this spring or magent force, and as the door in a previous operation has obtained an external layer of paint, it is imperative that the surface of the door is not touched. For these reasons the manipulator arm 17 with the magnets 20 is located at as short distance below the lower edge of the door as possible. A free air gap of e.g. 5-20 mm with a given magnetic force has proven itself to be appropriate, in view of occurring height variations of the car bodies. The magnets 20 are thus located upon the arm 17 so that a concentration of the field lines is achieved above them. If horseshoe-shaped permanent magnets are chosen, the poles should face the lower edge of the door 25. Pivoting of the arm 17 by means of the actuator 13 results in the magnetic force opening the door and pivoting it to open position, this function having been pre-programmed in the control equipment for the manipulator. The door can either be closed by the same manipulator or the car body can otherwise be moved to the consecutive working area, e.g. in order to paint its rear doors, whereby closing is effected by a manipulator particularly intended for this function. Independent of the working task given to the manipulator, the arm after terminated opening or closing movement, can be pivoted about the hinge axle 18 in a direction away from the door, whereby the air gap will be so big that the magnetic force is interrupted. The arm can return to its initial position after the car body has been moved.

Figure 3:
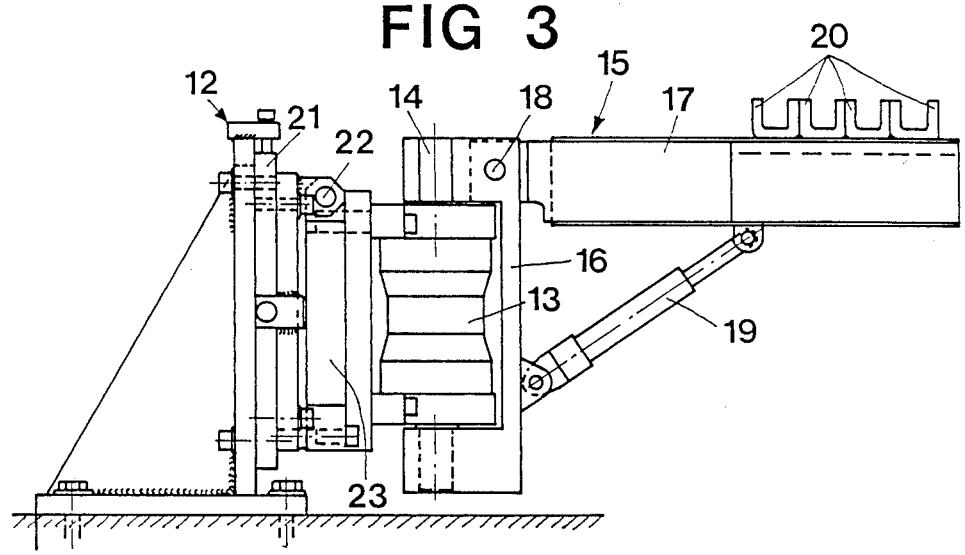
FIG. 3 shows a first embodiment of a manipulator according to the invention in side view.

Instead of tilting the arm 17, such as shown in the embodiment according to FIG. 3, the arm 17 together with actuator 13 can also be vertically displaceable along guides 27 provided on the frame 12. The displacement motion is then effected with an actuator 28, in accordance with what is shown in FIG. 4.

Figure 4:
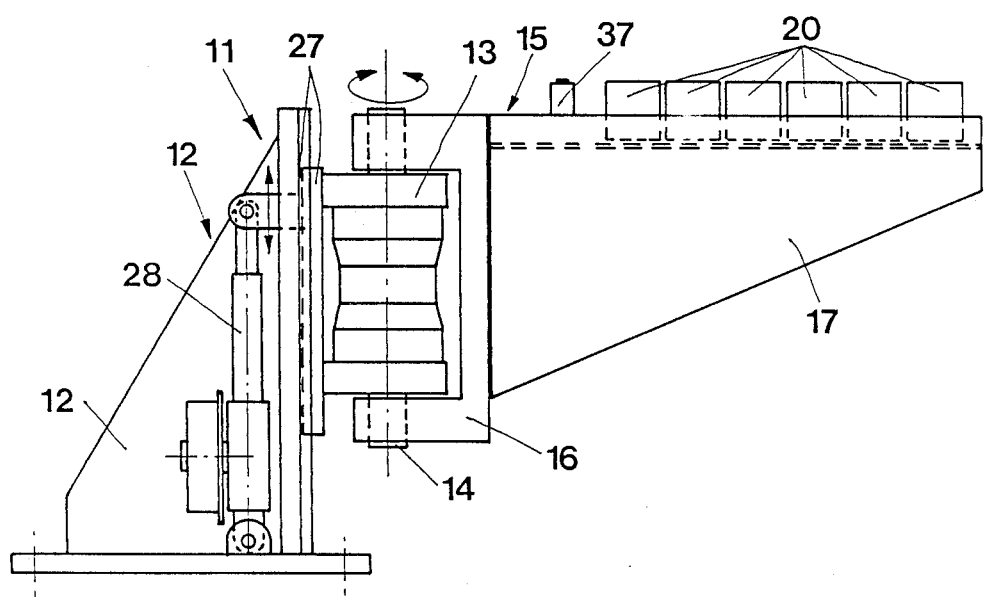
FIG. 4 shows a second embodiment of a manipulator according to the invention in side view.

The embodiment according to FIGS. 5 and 6 differs from the variations shown in FIGS. 3 and 4 in that the arm 17 carries an actuator 19 and 28 at each of its front and rear ends, e.g. hydraulic piston cylinder devices. The piston rods of the devices carry a magnet carrier 33, preferably of soft iron, and a pack of magnets 34 including a ceramic magnet block 35 upon which a rigidly fixed magnet bodies 20, preferably made of metallic compound of cobalt and rare earths in order to obtain the highest possible magnetic effect. In each of two of the magnet bodies 20 there is arranged a depression 36 for a transmitter 37, which can sense the position of the magnets in relation to the lower edge of door 25 without contacting the door 25.

As the hinges of the doors 25 can not be supposed to be completely free from play, and the car body can have an unstable position upon the conveyor, it can occur that the lower edge of the door can become situated below the highest permissible height level. In order to reduce the effects of a collision between the lower edge of the door and the manipulator, there is arranged over the magnets 20 a protective casing 39 made of a non-magnetic material, e.g. aluminum, the lower edge of said casing resting against one or more pressure pulse transmittors 40. The transmitters 40 control the actuators 19 and 28, via a signal control means 43, to effect an immediate lowering of the manipulator arm 15 if the casing should be subjected to a pressure, e.g. if a collision with a door should occur. The pressure transmitter can be liquid-filled hose which upon a pressure increase provides a signal which by the computer is converted into an order for lowering the arm.

As doors of different car body types have varying opening angles, and also the opening angle can very between a front door and a rear door, it is essential that the angle of the arm 15 relative to the frame 12 can be positioned. This is preferably achieved by means of the actuator 13, under the control of an angle transmitter 38, which can be arranged in a bore in the interior of the shaft journal 14.

The distance from the car body to the floor and thereby also to the upper edge of the magnets 20 can vary within certain limits, and it is therefore necessary that the air gap between the lower edge of the door 25 and the upper edge of the magnets can be adjusted. This is preferably accomplished by means of the transmitters 37 arranged on the arm 17 or in depressions in the magnets, and which in a contact-free manner optically or electronically sense the space between the door and the magnets and via a comparator emits a signal to the actuator 19 or 28 for a position adjustment of the arm 17. Instead of measuring the space it is also possible, by means of a Hall generator, to measure the instant magnetic field strength, which is proportional to the size of the air gap.

Figure 7:
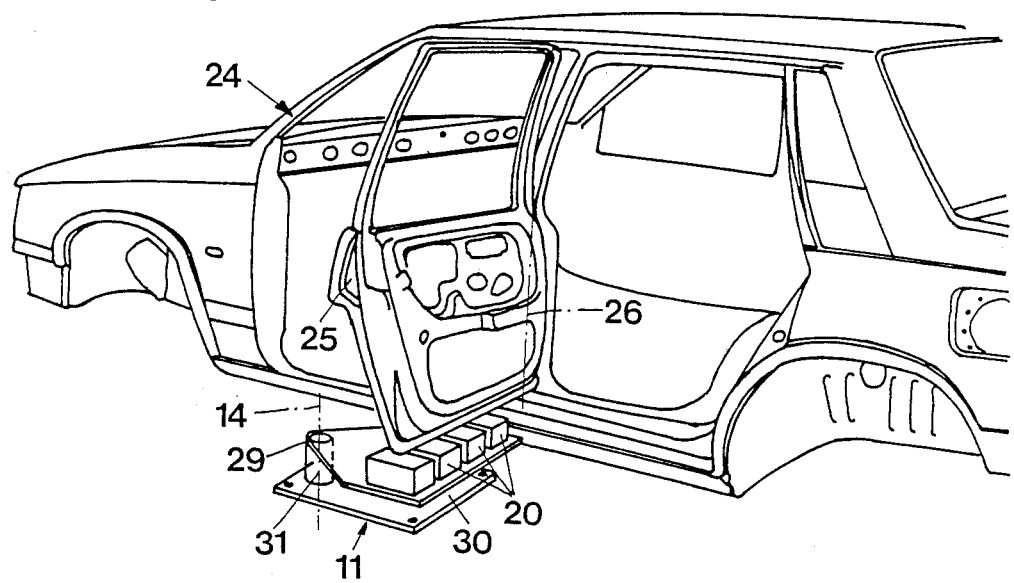
FIG. 7 is a view, similar to FIG. 1, showing another embodiment.
Figure 8:
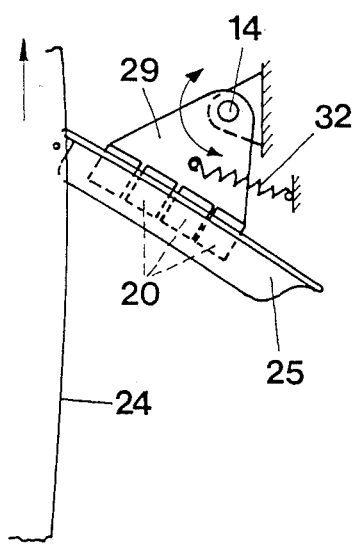
FIGS. 8 and 9 show schematically the closing process with the device according to FIG. 7 in a view from above.
Figure 9:
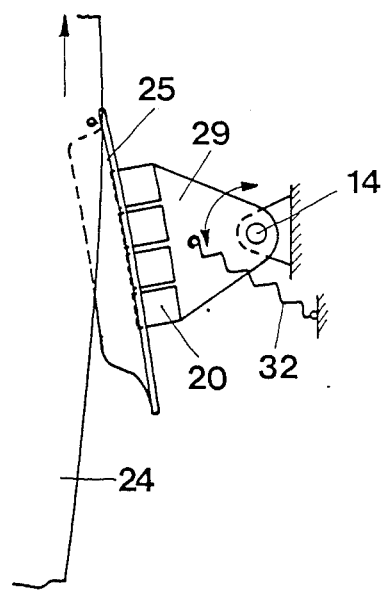

Certain movements, e.g. closing of a door or the like, can be achieved with a smaller power requirement, and the embodiment shown in FIGS. 7 to 9 has been developed for this purpose. In this embodiment the manipulator 11 includes a plate 29, to which is affixed a plurality of magnets 20. The plate 29 is pivotable about a vertical axle 14 relative to a base plate 30, and the plate 29 is vertically adjustable by means of a spacing member 31. The manipulator 11, in the same manner as in the embodiments described above, is located somewhat below the door 25 of the car body 24 and outside its pivoting area, such that a door which is open, during the transfer of the car body along the conveyor track, at a certain position will be situated just above the pack of magnets 20. The magnets will then exert a magnetic attraction force upon the lower edge of the door, which force is so big that the door, at continued transfer of the car body, will be pivoted concurrently with the transfer motion of the car body. At the same time the plate 29 with the magnets 20 rotate about the axle 14, such that a gradual closing of the door is effected. When the attraction force terminates, due to the fact that the door has passed the magnets, the plate 29 is pivoted back to its initial position by means of a tension spring 32 or the like.

Figure 10:
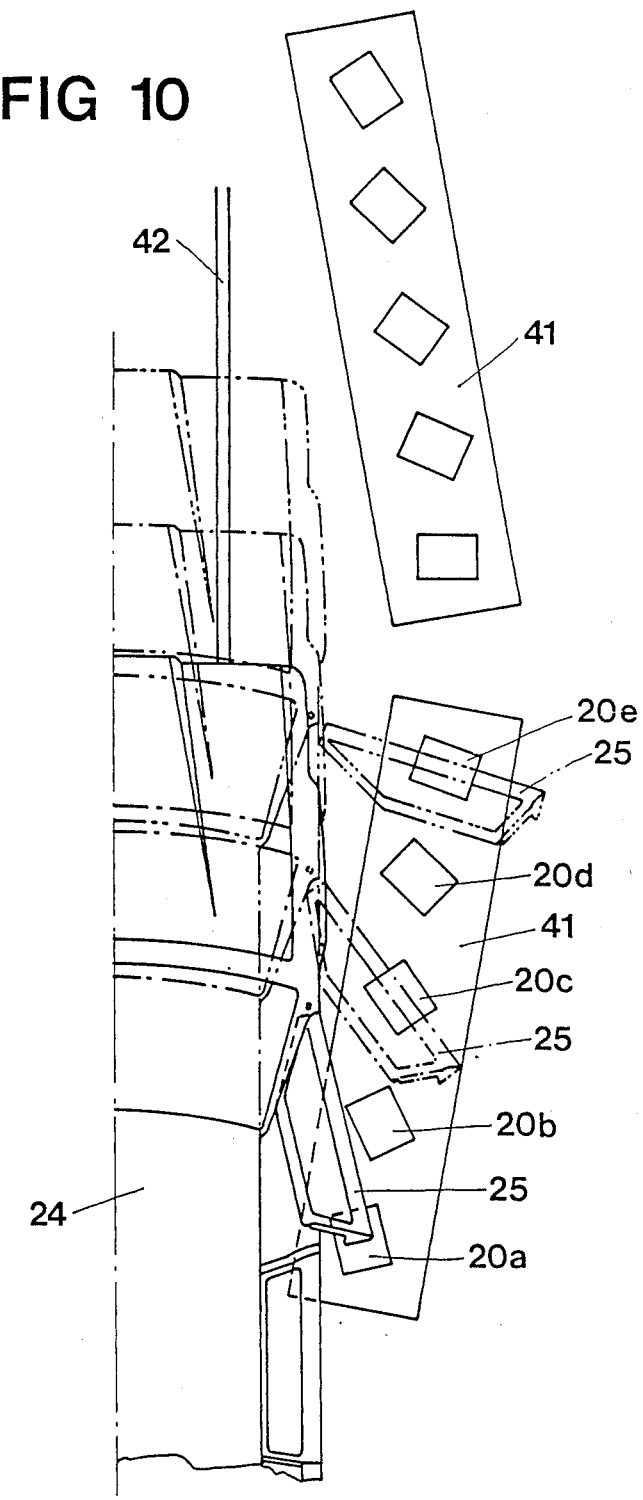
FIG. 10 shows in a view from above a manipulator according to the invention with stationary magnets arranged for opening as well as closing a structure member.

It is also possible to arrange the magnets 20 stationary, on one or more preferably vertically adjustable plates 41, such as shown in FIG. 10. The magnets are arranged in a pattern, which corresponds to the movement path which the door will perform when the car body 24 and its door is moved along a conveyor track 42 past the magnets. The door will be subjected to a lateral magnetic force which provides a pivoting of the door from or towards the car body as the distance to the nearest magnet 20a, 20b, 20c increases or decreases.

The invention is not limited to the embodiments shown, and a plurality of variations are possible within the scope of the claims. The magnets thus can be electro magnets, if an electric interruption of the magnet power is desired.

We claim:

1. A device for pivoting of a magnetic metallic structural member about the axle of a hinge, the hinge being fitted to the structural member and to an object so as to permit pivoting of said member along a path relative to the object, said device including at least one magnet for directly magnetically coupling with said member for effecting pivoting of said member about said axle, said magnet being located along said path and located a small distance outside an area over which said member is pivotable, said magnet being arranged to exert via an air gap a magnetic force upon at least one side of said member to thereby effect pivoting of said member about said axle upon relative movement between said magnet and said object wherein said magnet does not contact said object or said member.

2. A device as in claim 1 wherein said magnet is mounted on an arm pivoted for movement about an axis defined in a plane common to a plane of said arm and said hinge axle and which is substantially parallel to said hinge axle, the arrangement being such that said arm and said magnetic structural member can pivot together as a result of magnetic coupling between them.

3. A device as in claim 2 including actuating means for pivoting said arm about its pivot axis.

4. A device as in claim 2 wherein said arm pivots about its pivot axis under the influence of a magnetic force generated by motion of said magnetic structural member upon movement of said object relative to said arm.

5. A device as in claim 2 including means for moving said magnet vertically and for adjusting said magnet to different angular positions relative to said magnetic structural member in order to maintain a constant air gap between said magnet and said member and for swinging said arm away from said member when it is desired to interrupt the magnetic force acting between said member and said magnet.

6. A device as in claim 1 wherein said magnet is pivotally supported on a shaft whereby the relative position of said magnet to said magnetic structural member is self-adjusting to a limited extent under the influence of the magnetic force.

7. A device as in claim 2 wherein said object is mounted for movement along a path and wherein said arm is mounted for movement along a path parallel to the path of said object.

8. A device as in claim 5 including two transmitters supported by said arm for measuring the distance between said magnet and said structural member and generating a signal indicative of said distance, said signal being used as a control signal for said means for moving said magnet vertically and for adjusting the inclination of said magnet.

9. A device for pivoting of a magnetic metallic structural member about the axle of a hinge, the hinge being fitted to the structural member and to an object so as to permit pivoting of said member along a path relative to the object, said device including a plurality of magnets for directly magnetically coupling with said member for effecting pivoting of said member about said axle, said magnets being located along said path and located a small distance outside an area over which said member is pivotable, said magnets being arranged to exert via an air gap a magnetic force upon at least one side of said member, and said magnets being arranged in a fixed pattern such that they exert on said member a force effecting pivoting of said member about said axle upon movement of said object along said patern of magnets wherein said magnets do not contact said object or said member.

10. A device as in claim 9 wherein said structural member is also linearly movable along a conveyor track, wherein said magnets are vertically adjustable, and wherein said pattern of magnets corresponds to the motion path of said member, whereby the linear movement of said member along said track brings about pivoting of said member about its pivot axis.

11. A device for pivoting a structural member about the axle of a hinge, the hinge being fitted to the structural member and to an object so as to permit pivoting of said member relative to said object, said member having at least one edge portion which is magnetic and which swings along a planar path when said member pivots about said hinge axle relative to said object, said device comprising: an arm pivoted for rotation about an axis which is parallel to said hinge axle; at least one magnet carried by said arm, the arrangement being such that, upon pivoting of said arm, said magnet moves in a path parallel to said path of said magnetic portion of said member and spaced a small distance from said path of magnetic edge portion to provide an air gap between said magnetic edge portion and said magnet, whereby said magnet and said magnetic edge portion are out of contact with each other but can be directly magnetically coupled so as to move simultaneously in their respective paths upon pivoting of said member relative to said body; and means for swinging said arm about its pivot axis.

* * * * *